United States Patent
Kunishi et al.

(10) Patent No.: US 7,589,951 B2
(45) Date of Patent: Sep. 15, 2009

(54) LAMINATED ELECTRONIC COMPONENT AND METHOD FOR MANUFACTURING THE SAME

(75) Inventors: Tatsuo Kunishi, Moriyama (JP); Makoto Ogawa, Fukui (JP); Akihiro Motoki, Fukui (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/030,360

(22) Filed: Feb. 13, 2008

(65) Prior Publication Data
US 2008/0123249 A1 May 29, 2008

Related U.S. Application Data

(63) Continuation of application No. PCT/JP2007/051900, filed on Feb. 5, 2007.

(30) Foreign Application Priority Data
Feb. 27, 2006 (JP) ............................. 2006-051218

(51) Int. Cl.
*H01G 4/228* (2006.01)
(52) U.S. Cl. .................... 361/306.3; 361/309; 29/25.42
(58) Field of Classification Search .................. 361/303, 361/306.1, 306.3, 309–310; 29/25.42
See application file for complete search history.

(56) References Cited

U.S. PATENT DOCUMENTS

| | | | |
|---|---|---|---|
| 6,621,682 B1 * | 9/2003 | Takakuwa et al. | ........ 361/306.3 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |

(Continued)

FOREIGN PATENT DOCUMENTS

EP  183399 A2  6/1986

(Continued)

OTHER PUBLICATIONS

Kunishi et al.; "Method of Manufacturing Multilayer Electronic Component"; U.S. Appl. No. 12/041,889, filed Mar. 4, 2008.

(Continued)

*Primary Examiner*—Eric Thomas
(74) *Attorney, Agent, or Firm*—Keating & Bennett, LLP (57) ABSTRACT

A laminated body is prepared, in which at an end surface at which internal electrodes are exposed, the internal electrodes disposed adjacently are electrically isolated from each other, and a distance between the internal electrodes disposed adjacently is about 20 μm or less when measured along the thickness direction of an insulator layer, and a withdrawn-depth of the internal electrodes is about 1 μm or less when measured from the end surface. In a step of electroless plating, plating deposits formed at the end portions of the plurality of internal electrodes are increased in size so as to be connected to each other.

10 Claims, 4 Drawing Sheets

U.S. PATENT DOCUMENTS

| | | |
|---|---|---|
| 7,463,474 B2 | 12/2008 | Ritter et al. |
| 2005/0046536 A1 | 3/2005 | Ritter et al. |
| 2005/0146837 A1* | 7/2005 | Ritter et al. .............. 361/306.1 |
| 2007/0014075 A1 | 1/2007 | Ritter et al. |
| 2008/0123248 A1 | 5/2008 | Kunishi et al. |
| 2008/0123249 A1 | 5/2008 | Kunishi et al. |
| 2008/0158774 A1* | 7/2008 | Trinh ..................... 361/306.3 |

FOREIGN PATENT DOCUMENTS

| | | | |
|---|---|---|---|
| JP | 58-100482 A | 6/1983 |
| JP | 60-176215 A | 9/1985 |
| JP | 63-169014 A | 7/1988 |
| JP | 63-224210 A | 9/1988 |
| JP | 3-29307 A | 2/1991 |
| JP | 5-343259 A | 12/1993 |
| JP | 6-204080 A | 7/1994 |
| JP | 10-208978 A | 8/1998 |
| JP | 11-354378 A | 12/1999 |
| JP | 2002-53999 A | 2/2002 |
| JP | 2002-252141 A | 9/2002 |
| JP | 2004-95680 A | 3/2004 |
| JP | 2004-146401 A | 5/2004 |
| JP | 2007-36003 A | 2/2007 |

OTHER PUBLICATIONS

Motoki et al.; "Multilayer Electronic Component and Method for Manufacturing Multilayer Electronic Component"; U.S. Appl. No. 12/055,372, filed Mar. 26, 2008.

Motoki et al.; "Multilayer Electronic Device and Method for Manufacturing the Same"; U.S. Appl. No. 12/109,371, filed Apr. 25, 2008.

Motoki et al.; "Multilayer Electronic Component and Method for Manufacturing the Same"; U.S. Appl. No. 12/110,484, filed Apr. 28, 2008.

Official communication issued in the International Application No. PCT/JP2007/051900, mailed May 1, 2007.

Kunishi et al.; "Laminated Electronic Component and Method for Manufacturing the Same"; U.S. Appl. No. 12/030,282, filed Feb. 13, 2007.

Official communication issued in counterpart International Application No. PCT/JP2006/320200, mailed on Dec. 26, 2006.

Kunishi et al.: "Laminated Ceramic Electronic Component"; U.S. Appl. No. 12/489,631, filed on Jun, 23, 2009.

Tani: "Multilayer Electronics Component and Method for Manufacturing the Same"; U.S. Appl. No. 12/481,690; filed on Jun. 10, 2009.

* cited by examiner

LAMINATED ELECTRONIC COMPONENT AND METHOD FOR MANUFACTURING THE SAME

BACKGROUND OF THE INVENTION

1. Field of the Invention

The present invention relates to a laminated electronic component and a method for manufacturing the laminated electronic component, and more particularly, to a laminated electronic component having external electrodes formed by plating directly on an external surface of a laminated body and a method for manufacturing the laminated electronic component.

2. Description of the Related Art

Figure 11:
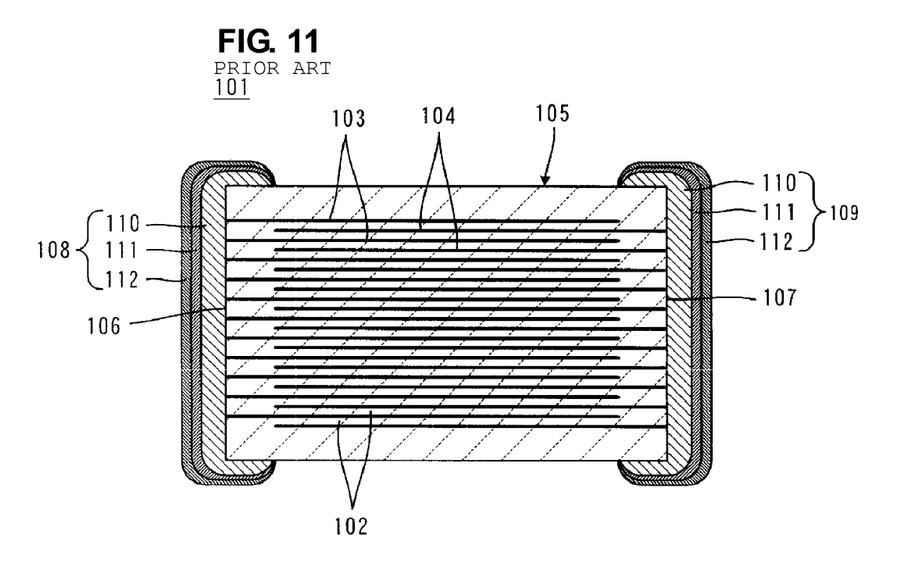
FIG. 11 is a cross-sectional view of an existing laminated electronic component.

As shown in FIG. 11, a laminated electronic component 101 such as a laminated ceramic capacitor, which is a typical example, usually includes a laminated body 105 including a plurality of laminated insulator layers 102 and a plurality of lamellar internal electrodes 103 and 104 extending along surfaces of the insulator layers 102. End portions of the internal electrodes 103 and 104 are exposed at an end surface 106 and an end surface 107 opposite thereto of the laminated body 105, respectively. External electrodes 108 and 109 are arranged so as to electrically connect the end portions of the internal electrodes 103 to each other and the end portions of the internal electrodes 104 to each other, respectively.

Usually, the external electrodes 108 and 109 are formed by applying a metal paste including a metal component and a glass component to the end surfaces 106 and 107 of the laminated body 105, baking so as to form a paste electrode layer 110, forming a first plating layer 111 including Ni or other suitable metal as a main component on the paste electrode layer 110, and forming a second plating layer 112 including Sn or other suitable metal as a main component on the first plating layer 111. That is, each of the external electrodes 108 and 109 have a three-layer structure including the paste electrode layer 110, the first plating layer 111, and the second plating layer 112.

The external electrodes 108 and 109 need to have good wettability for soldering when the laminated electronic component 101 is mounted on a substrate with solder. Furthermore, the external electrode 108 must electrically connect the plurality of internal electrodes 103 to each other, which are electrically isolated, and the external electrode 109 must electrically connect the plurality of internal electrodes 104 to each other, which are electrically isolated. The second plating layer 112 has a function of ensuring wettability for soldering and the paste electrode layer 110 has a function of electrically connecting the internal electrodes 103 to each other or the internal electrodes 104 to each other. The first plating layer 111 has a function of preventing leaching or wicking in a solder-bonding process.

The thickness of the paste electrode layer 110 is as large as a few tens of μm to a few hundred μm. Therefore, in order to manufacture the laminated electronic component 101 so as to have a desired standard size, an effective volume of the laminated electronic component 101 that determines an electrostatic capacity thereof must be reduced because the volume of the paste electrode layer 110 having the above-mentioned volume is included in the standard size dimensions. In contrast, the thickness of each of the plating layers 111 and 112 is about a few μm. Therefore, if the external electrodes 108 and 109 are formed with the first plating layer 111 and the second plating layer 112 alone, the effective volume of the laminated electronic component 101 that determines an electrostatic capacity thereof can be increased.

For example, Japanese Unexamined Patent Application Publication 2004-146401 discloses a method including applying a conductive paste on an end surface, which includes at least one ridge extending in the direction perpendicular to laminated internal electrodes, of a laminated body, so as to be in contact with extending portions of the internal electrodes, forming a conductive film by baking or thermally curing the conductive film, and then electrolytically plating the end surface of the laminated body so as to form an electrolytic plating film connecting to the conductive film formed on the ridge. According to this method, the thickness of an external electrode at an end surface is reduced.

Japanese Unexamined Patent Application Publication 63-169014 discloses a method for depositing a conductive metal film by electroless plating over side surfaces of a laminated body to connect the internal electrodes to each other, which are exposed on the side surfaces.

When the method for forming an external electrode described in Japanese Unexamined Patent Application Publication 2004-146401 is used, the electrolytic plating film and the exposed internal electrodes can be directly connected. A conductive portion made of conductive paste, however, must be formed in order to electrically connect the extending portions of the exposed internal electrodes before performing electrolytic plating. There are problems with this method for applying the conductive paste to a desired portion of the laminated body and, furthermore, the effective volume rate of the laminated body is decreased because the conductive paste has a large thickness.

On the other hand, when the method for electroless plating described in Japanese Unexamined Patent Application Publication 63-169014 is used, if a material such as Pd having high catalytic activity is not applied on the surface prepared in advance for a plating process, the compactness and homogeneity of the resulting plating film are decreased. This leads to a problem that a plating solution enters inside of the laminated body and the reliability of the laminated body is significantly reduced. Whether a high catalytic activity material is applied or not is not described in Japanese Unexamined Patent Application Publication 63-169014. However, if a homogeneous plating film is formed as described in Japanese Unexamined Patent Application Publication 63-169014, it is highly possible that a material having high catalytic activity is applied in advance. However, the process for adding a catalyst is cumbersome and it has a problem in that a plating film may be easily deposited on undesirable portions.

Furthermore, in the method described in Japanese Unexamined Patent Application Publication 63-169014, the material of the internal electrodes disposed in the laminated body is Pd or Pt. The use of such an expensive metal leads to an increase in the cost of the laminated electronic components.

Furthermore, in the method described in Japanese Unexamined Patent Application Publication 63-169014, the thickness of the internal electrodes must be at least about 1 μm. This leads to an increase in the volume of the laminated body and an increase in the cost of the laminated electronic component.

SUMMARY OF THE INVENTION

To overcome the problems described above, preferred embodiments of the present invention provide a method for manufacturing laminated electronic components having a high effective volume rate by forming external electrodes thereof using substantially only plating deposits.

Preferred embodiments of the present invention also provide a method for manufacturing laminated electronic components having a high reliability and a method for easily forming an external electrode made of compact plating film, without the need for performing cumbersome processes in advance, for example, processes for applying a conductive paste or adding a catalyst in order to form external electrodes.

Another preferred embodiment of the present invention provides laminated electronic components manufactured by the methods described above.

A preferred embodiment of the present invention provides a method for manufacturing a laminated electronic component including the steps of preparing a laminated body including a plurality of laminated insulator layers and a plurality of internal electrodes extending along surfaces of the insulator layers, wherein end portions of the internal electrodes are exposed at a predetermined surface, and forming an external electrode on the predetermined surface of the laminated body to electrically connect the end portions of the plurality of internal electrodes being exposed at the predetermined surface of the laminated body to each other.

In the method for manufacturing the laminated electronic component according to this preferred embodiment, a laminated body is prepared in which, at a predetermined surface at which internal electrodes are exposed, the internal electrodes are isolated electrically from the adjacent internal electrodes, wherein a distance between the internal electrodes disposed adjacently is about 20 μm or less when measured along the thickness direction of the insulator layer and a withdrawn-depth of the internal electrodes is about 1 μm or less when measured from the predetermined surface.

In a method for manufacturing the laminated electronic component according to another preferred embodiment of the present invention, a laminated body is prepared in which, at a predetermined surface at which internal electrodes are exposed, the internal electrodes are isolated electrically from the adjacent internal electrodes, wherein a distance between the internal electrodes disposed adjacently is about 50 μm or less when measured along the thickness direction of the insulator layer and a protrusion length of the internal electrodes is at least about 0.1 μm when measured from the predetermined surface.

The step of forming the external electrodes preferably includes a step of electroless plating, and the electroless plating using a plating solution including a reducer is performed directly on the end portions of the plurality of internal electrodes being exposed at the predetermined surface of the laminated body, and the step of electroless plating includes a step of growing plating deposits formed at the end portions of the plurality of internal electrodes so as to be connected to each other.

It is preferable that the withdrawn-depth or the protrusion length of the internal electrodes mentioned above is adjusted by polishing the laminated body with an abrasive before a process for forming external electrodes.

Another preferred embodiment of the present invention provides a laminated electronic component that includes a laminated body including a plurality of laminated insulator layers and a plurality of internal electrodes extending along surfaces of the insulator layers, the laminated body having a predetermined surface at which end portions of the internal electrodes are exposed, and external electrodes provided on the predetermined surface of the laminated body in order to electrically connect the end portions of the plurality of internal electrodes to each other, the end portions being exposed at the predetermined surface of the laminated body.

In a laminated electronic component according to a preferred embodiment of the present invention, at a predetermined surface at which internal electrodes of a laminated body are exposed, a distance between the internal electrodes disposed adjacently is about 20 μm or less when measured along the thickness direction of the insulator layer and a withdrawn-depth of the internal electrodes is about 1 μm or less when measured from the predetermined surface.

In a laminated electronic component according to another preferred embodiment of the present invention, at a predetermined surface at which internal electrodes of a laminated body are exposed, a distance between the internal electrodes disposed adjacently is about 50 μm or less when measured along the thickness direction of the insulator layer, and a protrusion length of the internal electrodes is at least about 0.1 μm when measured from the predetermined surface.

Furthermore, in the laminated electronic component, at least a portion of the external electrode connected directly to the internal electrodes is defined by plating deposits formed by electroless plating.

In preferred embodiment of the present invention, it is preferable that a main component of the internal electrodes is at least one element selected from Ni, Cu, and Ag.

According to preferred embodiments of the present invention, since an external electrode of a laminated electronic component can be provided using substantially only plating deposits, a laminated electronic component having a high effective volume rate is obtained.

Also, according to preferred embodiments of the present invention, without the need for performing cumbersome processes in advance, for example, processes for applying a conductive paste or adding a catalyst in order to form the external electrode, at least a portion of the external electrode, which is directly connected to internal electrodes, can be easily formed with highly compact and homogeneous electroless plating deposits. As a result, a laminated electronic component with high reliability is obtained.

Furthermore, an electroless-plating-film which is highly compact can be obtained without using metals having high catalytic activity such as Pd and Pt, as a main component of the internal electrodes. Therefore, low-cost metals such as Ni, Cu, and Ag can be used for the internal electrodes, which results in a low-cost laminated electronic component.

Furthermore, since a compact electroless-plating-film can be formed even if the thickness of the internal electrodes is less than about 1 μm, a small and low-cost laminated electronic component can be obtained.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

With reference to FIGS. 1 to 5, a laminated electronic component 1 and a method for manufacturing thereof according to a first preferred embodiment of the present invention will be now described.

Figure 1:
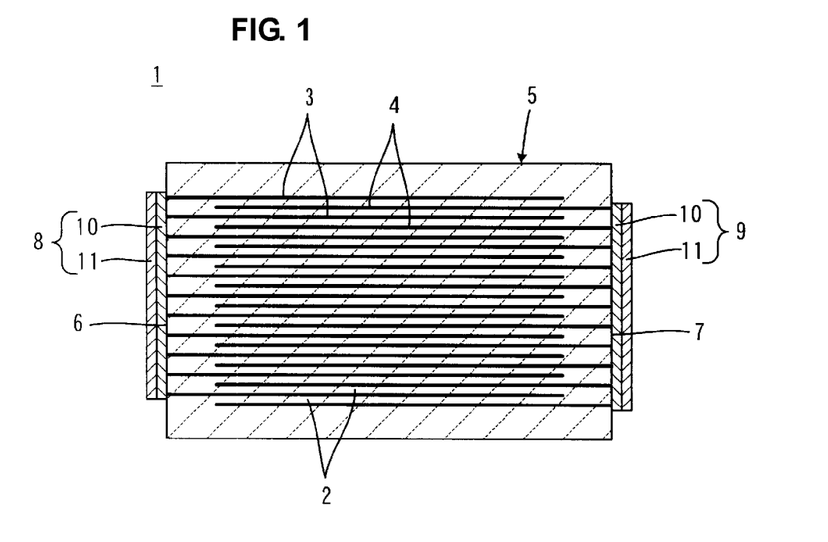
FIG. 1 is a cross-sectional view of a laminated electronic component according to a first preferred embodiment of the present invention.

As shown in FIG. 1, the laminated electronic component 1 includes a laminated body 5 including a plurality of laminated insulator layers 2 and a plurality of lamellar internal electrodes 3 and 4 extending along surfaces of the insulator layers 2. When the laminated electronic component 1 defines a laminated ceramic capacitor, the insulator layers 2 are made of a dielectric ceramic. End portions of the plurality of internal electrodes 3 and 4 are exposed at an end surface 6 and the other end surface 7 opposite the end surface 6 of the laminated body 5, respectively. External electrodes 8 and 9 are provided in order to electrically connect the end portions of the internal electrodes 3 to each other and the end portions of internal electrodes 4 to each other, respectively.

The external electrodes 8 and 9 are substantially composed of plating deposits and include a first plating layer 10 deposited on the end surfaces 6 and 7 in which the internal electrodes 3 and 4 are exposed, respectively, and a second plating layer 11 deposited on the first plating layer 10.

Since the second plating layer 11 defining an outer layer must have good wettability with solder, Sn or Au is preferably used as a main component of the second plating layer 11. Furthermore, since the first plating layer 10 must prevent leaching or wicking in a solder-bonding process electrically connect the internal electrodes 3 to each other and the internal electrodes 4 to each other, which are electrically isolated, Ni is preferably used as a main component of the first plating layer 10.

The first plating layer 10, which is directly connected to the internal electrodes 3 or 4, is not formed by an electrolysis plating process using an electric power supply, but rather, is formed by an electroless plating process using a reducing agent for depositing metal ions. Note that if a phosphoric-acid reducing agent or a boric reducing agent is used, the first plating layer 10 composed of the plating deposits usually includes phosphorus or boron.

When the first plating layer 10 is formed by electroless plating, before an electroless plating process, a catalytic material such as Pd, which accelerates the reducing reaction of the reducing agent, is typically applied in advance to a surface on which a plating layer is formed. According to a preferred embodiment of the present invention, however, this process for applying the catalytic material is omitted. Therefore, a homogeneous layer including the catalytic material is not provided between the first plating layer 10 and the end surface 6 at which the internal electrodes 3 are exposed, and between the first plating layer 10 and the end surface 7 at which the internal electrodes 4 are exposed. Films formed directly on the end surfaces 6 and 7 at which the internal electrodes 3 and 4 are exposed, respectively, do not include any of a conductive paste film, a vacuum deposited film, a sputtered film, and other type of film.

Next, a method for manufacturing the laminated electronic component 1 shown in FIG. 1 is described below with reference to FIGS. 2 to 5. The method for forming external electrodes 8 and 9, and, in particular, the first plating layer 10 is primarily described.

Figure 2:
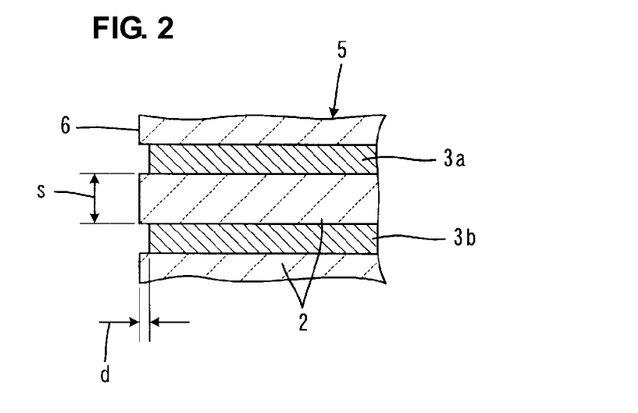
FIG. 2 is an enlarged cross-sectional view of a portion showing exposed internal electrodes of a laminated body shown in FIG. 1.

FIG. 2 is an enlarged cross-sectional view of the end surface 6 and its vicinity showing the exposed internal electrodes 3 of the laminated body 5 shown in FIG. 1. FIG. 2 shows the end surface of the laminated body 5 before formation of the external electrode 8. Among the internal electrodes 3, two internal electrodes located in a portion of the laminated body 5 shown in the FIG. 2 are indicated by reference marks "3a" and "3b". FIG. 2 shows the vicinity of the portion of the end surface 6 at which the internal electrodes 3 are exposed. The plurality of internal electrodes 3 represented by the internal electrodes 3a and 3b are electrically isolated from each other at this stage.

Note that since the other end surface 7 and the internal electrodes 4 exposed at the other end surface 7 are substantially the same as in the above-mentioned end surface 6 and the internal electrodes 3, illustration and description thereof are omitted.

Figure 3:
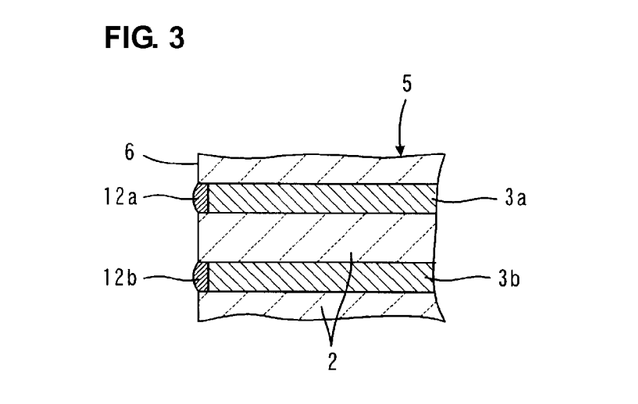
FIG. 3 is a cross-sectional view showing plating deposits deposited on the exposed surface of the internal electrodes shown in FIG. 2.

In order to form the first plating layer 10, at first, the laminated body 5 shown in FIG. 2, is immersed into a bath filled with plating solution including a reducing agent and metal ions having a higher electrochemically positive deposition potential than an oxidation-reduction potential of the reducing agent. Then the bath is rotated, shaken, tilted, or vibrated in order to agitate the laminated body 5 in the plating solution so that electrons generated by interaction between the reducing agent and the exposed internal electrodes 3a and 3b are supplied to the internal electrodes 3a and 3b. The metal ions in the solution accept electrons so as to form the metal on exposed surfaces of the internal electrodes 3a and 3b. FIG. 3 shows plating deposits 12a and 12b deposited on the above-mentioned exposed surfaces of the internal electrodes. The internal electrodes 3a and 3b at this stage are still electrically isolated from each other.

Figure 4:
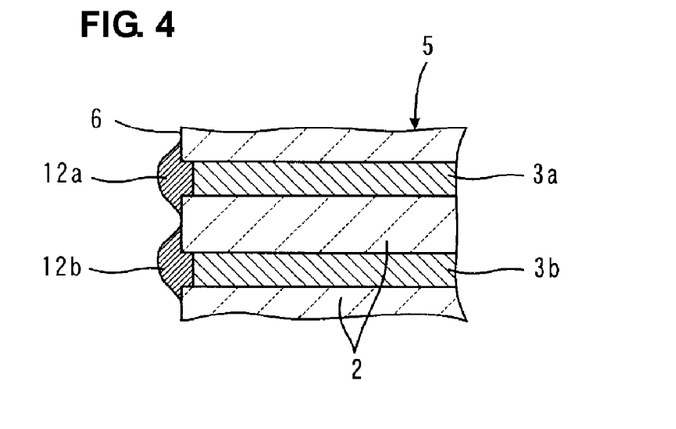
FIG. 4 is a cross-sectional view showing a growing state of plating deposits shown in FIG. 3.

In time, more metal ions are deposited and the plating deposits 12a and 12b grow larger. This process is shown in FIG. 4. As the plating deposits 12a and 12b grow larger, the deposition rate of the metal ions increases.

Figure 5:
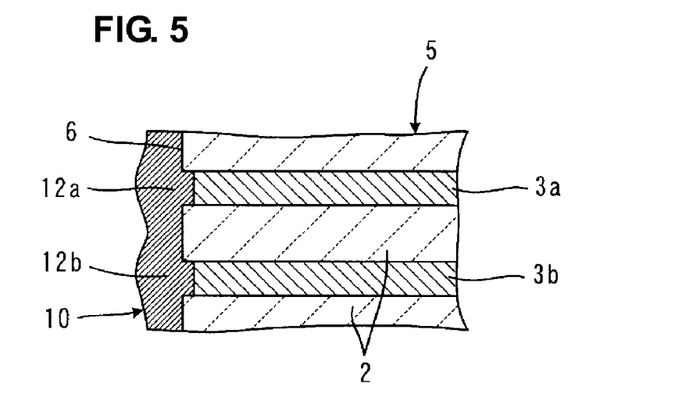
FIG. 5 is a cross-sectional view showing a forming state in which the plating deposits shown in FIG. 4 have grown larger and aggregate to form one body defining a first plating layer.

Under the electroless plating process, metal ions continue to be deposited and the plating deposits 12a and 12b continue to grow larger so as to contact each other and aggregate to form one body. When the process advances further, the first plating layer 10, which electrically connects the plurality of exposed internal electrodes 3 to each other, is formed. This state is shown in FIG. 5.

In the above-mentioned electroless plating process, similar to the electrolytic plating process, media together with the laminated body 5 may be added into the bath filled with the plating solution when agitation is performed. Although the media do not have a function of electrical conduction, the media may improve the agitation performance for the laminated body 5 so as to advantageously facilitate deformation of the plating deposits 12a and 12b. For example, the plating deposits 12a and 12b extend along the end surface 6, as shown in FIG. 4, by deformation caused by collision with the media.

In FIG. 2 showing the laminated body 5 before the formation of an external electrode 8, the distance between the adjacent internal electrodes 3a and 3b is defined as "s", which is determined along the thickness direction of an insulator layer 2. Furthermore, in the area in which the internal electrodes 3 are exposed, the length from the end surface 6 of the laminated body 5 to the surface of the internal electrodes 3a or 3b is defined as a withdrawn-depth "d". Note that the above-mentioned value of the withdrawn-depth "d" varies when measured along the longitudinal direction (perpendicular to the plane of FIG. 2) of the exposed internal electrodes. The withdrawn-depth "d" referred to herein is the average length determined from the lengths measured along the longitudinal direction.

As mentioned above, the phenomenon illustrated in FIGS. 2 to 5, occurs because the plating deposits 12a and 12b grow at a high rate. The plating deposits 12a and 12b easily extend in the direction of the surface of the surface 6 when they grow and easily aggregate to form one body when they contact each other.

In order to promote the above-mentioned phenomenon, the laminated body 5, which does not yet include the external electrode 8, preferably has a structure in which the distance "s" between the internal electrode 3a and the adjacent internal electrode 3b is about 20 μm or less and the withdrawn-depth "d" of the internal electrodes 3a and 3b is about 1 μm or less.

When the distance "s" is about 20 μm or less, the plating deposits 12a and 12b, which are shown in FIGS. 3 and 4, can contact each other within a shorter range. Therefore, the desired length of the plating deposits is decreased. Furthermore, the probability of the plating deposits 12a and 12b contacting each other increases. Therefore, the first plating layer 10 can be easily formed and compactness thereof can be increased.

When the withdrawn-depth "d" is about 1 μm or less, the metal ions are easily deposited at the exposed portions of the internal electrodes 3a and 3b, which results in suitable growth of the plating deposits 12a and 12b. Therefore, the first plating layer 10 can be easily formed and the compactness thereof can be increased.

A representative example of the laminated electronic component 1 defining a laminated ceramic capacitor includes an insulator layer 2 made of a barium titanate dielectric material and internal electrodes 3 and 4 made of base metals such as Ni, Cu, and Ag as main components. In this example, after firing, the internal electrodes 3 and 4 of a laminated body 5 are often withdrawn relatively deeply from the end surfaces 6 and 7 toward the inside of the laminated body 5. In such a case, in order to make the withdrawn-depth "d" about 1 μm or less, a portion of the insulator layer 2 may be scraped off by performing abrading processes, such as a sandblasting process and a barrel polishing process.

Even if the withdrawn-depth "d" of the internal electrodes 3 and 4 of the laminated body 5, which has been fired, is about 1 μm or less, it is preferable that the above-mentioned abrading process is performed in order to remove an oxide film on the surface of the internal electrodes 3 and 4, and to roughen surfaces thereof. The reason for this is that the adhesiveness of the plating deposits 12a and 12b to the internal electrodes 3 and 4 is improved in the electroless plating process.

Furthermore, the above-mentioned abrading process ensures formation of a plating film having a greater compactness. In this case, the thickness of the internal electrodes 3 and 4 need not be large and it is sufficient if the thickness thereof is less than about 1 μm. The thickness can be reduced to about 0.2 μm and the resulting thin electrodes have advantages in terms of cost and miniaturization.

A main component of the internal electrodes 3 and 4 does not include a metal such as Pd or Pt having high catalytic activity in electroless plating. Ni, Cu, Ag, or other suitable metals can be used without problems. If the main component of the internal electrodes 3 and 4 is Ni, phosphoric acid system reducers such as sodium hypophosphite can be suitably used in the electroless plating process, and if the main component of the internal electrodes 3 and 4 is Cu or Ag, aldehyde reducers such as formaldehyde can be suitably used in the electroless plating process.

Furthermore, if the main component of the internal electrodes 3 and 4 is Ni, Cu, or Ag, these elements may be included in an alloy including other metal components.

Next, as shown in the present preferred embodiment, when the second plating layer 11 is further formed, the second plating layer 11 may be formed on the first plating layer 10 by an existing plating process. In the step for forming the second plating layer 11, the portion to be plated already has a continuous surface having conductivity. Therefore, the second plating layer 11 can be easily formed. The second plating layer 11 can be formed by not only electroless plating but also by electrolytic plating.

The external electrodes 8 and 9 are not limited to a two-layer structure as shown in FIGS. 1 to 5 of the present preferred embodiment. The structure may be a one-layer structure or a structure having three or more layers. Examples of the structure include a three-layer structure having a Cu plating layer, Ni plating layer, and Sn plating layer as first, second, and third plating layers in this order, and a four-layer structure having a Ni plating layer, Cu plating layer, Ni plating layer, and Sn plating layer as first, second, third, and fourth plating layers in this order.

Figure 6:
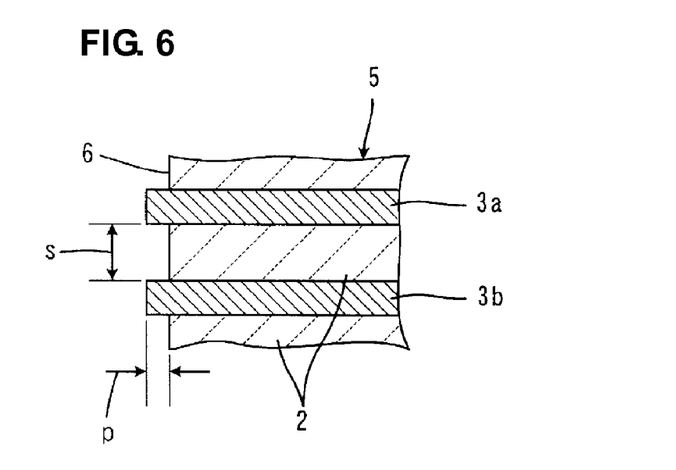
FIG. 6 is a cross-sectional view showing a second preferred embodiment of the present invention, which corresponds to FIG. 2.

FIG. 6 is a view showing a second preferred embodiment of the present invention and corresponds to FIG. 2. In FIG. 6, the same reference numerals will be used to denote components corresponding to those shown in FIG. 2, and redundant description is omitted.

The second preferred embodiment includes internal electrodes 3a and 3b that protrude from an end surface 6. More specifically, each protrusion length "p" of the internal electrodes 3a and 3b measured from the end surface 6 is at least about 0.1 μm. In the present preferred embodiment, the distance "s" between the internal electrode 3a and the adjacent internal electrode 3b, which is measured along the end surface 6 of a laminated body 5 in the thickness direction of an insulator layer 2, is not necessarily reduced to about 20 μm or less, and instead, the distance "s" can be about 50 μm or less.

Note that the above-mentioned value of the protrusion length "p" varies to some extent when measured along the longitudinal direction (perpendicular to the plane of FIG. 6) of the exposed internal electrodes. The protrusion length "p" referred to herein is an average length determined from the lengths measured along the longitudinal direction.

As mentioned above, by making the protrusion length "p" at least about 0.1 μm, deposition formed by electroless plating and growth of the plating deposits are significantly facilitated. Therefore, compared to the plating film in the first preferred embodiment, the resulting plating film can be more compact and since the distance "s" between the adjacent internal electrodes 3a and 3b can be increased, a freedom of design of laminated electronic components is increased.

Note that drawings and description of the other end surface 7 and the internal electrodes 4 being exposed at the other surface 7 (see FIG. 1) are omitted because they are substantially the same as those of the end surface 6 and the internal electrodes 3.

In order to extend the internal electrodes 3a and 3b from the end surface 6, available methods include abrading under higher pressure and abrading with an abrasive including metal component for increasing the hardness thereof. In particular, if an insulator layer 2 is made of ceramics, since the ceramics can be easily abraded as compared to the internal electrodes 3a and 3b, the internal electrodes 3a and 3b are easily protruded by applying sandblasting or barrel grinding. Furthermore, if laser ablation is used, the ceramic can be selectively and effectively abraded so that the internal electrodes 3a and 3b are protruded more easily.

Figure 7:
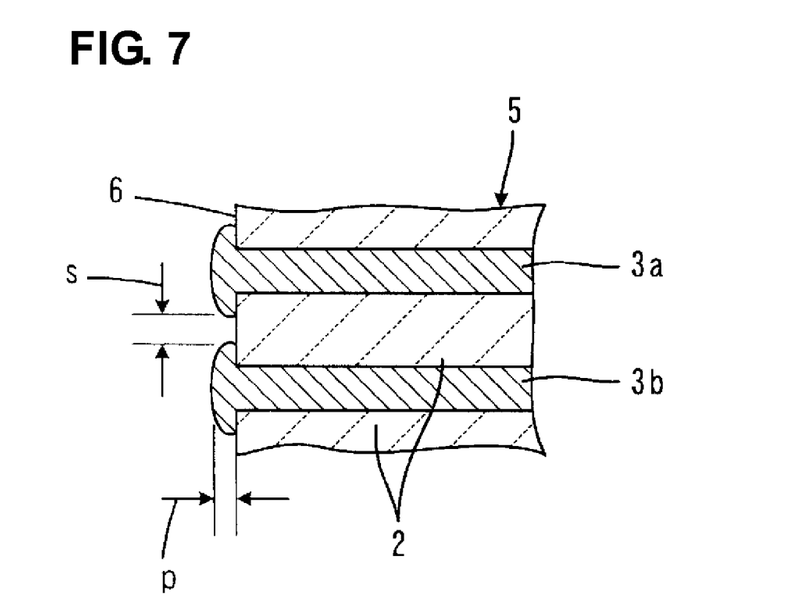
FIG. 7 is a cross-sectional view showing a third preferred embodiment of the present invention, which corresponds to FIG. 6.

FIG. 7 shows a third preferred embodiment of the present invention and corresponds to FIG. 6. In FIG. 7, the same reference numerals will be used to denote similar components to those shown in FIG. 6, and redundant description is omitted.

The preferred embodiment shown in FIG. 7 satisfies the condition in which the distance "s" between an internal electrode 3a and an adjacent internal electrode 3b, which is measured along an end surface 6 of a laminated body 5 in the thickness direction of an insulator layer 2, is about 50 μm or less and each protrusion length "p", which is measured from the end surface 6, of the internal electrodes 3a and 3b is at least about 0.1 μm.

The preferred embodiment described with reference to FIG. 7 may be performed after the process shown in FIG. 6, if required. When end portions of the internal electrodes 3a and 3b sufficiently protrude from the end surface 6, if abrading is continued, as shown in FIG. 7, the end portions of the internal electrodes 3a and 3b are pressed so as to be flat and extend in the direction along the end surface 6. As a result, each protrusion length "p", which is measured from the end surface 6, of the internal electrodes 3a and 3b is decreased to be less than the length shown in FIG. 6. However, the distance "s" between the internal electrode 3a and the adjacent internal electrode 3b is also decreased to less than the length thereof shown in FIG. 6.

According to the preferred embodiment shown in FIG. 7, a length between the plating deposits which grow to be connected to each other, is substantially reduced. As a result, homogeneity of the plating deposits is improved and efficiency of plating is greatly improved. Furthermore, according to the present preferred embodiment, even if the thickness of the insulator layer 2 disposed between the internal electrode 3a and the adjacent internal electrode 3b is relatively thick, the distance "s" between the internal electrode 3a and the adjacent internal electrode 3b is reduced.

Figure 8:
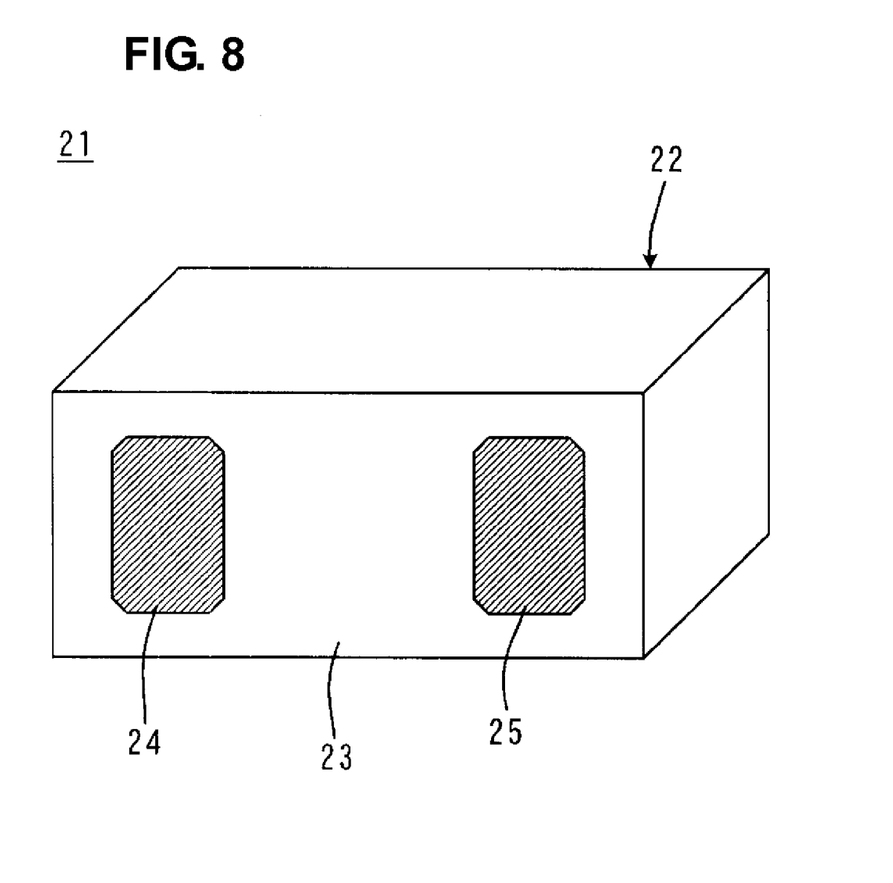
FIG. 8 is an external perspective view of a laminated electronic component according to a fourth preferred embodiment of the present invention.

FIG. 8 is an external perspective view of the laminated electronic component 21 according to a fourth preferred embodiment of the present invention.

The laminated electronic component 21 shown in FIG. 8 includes a laminated body 22. The laminated electronic component 21 includes a plurality of, for example, two external electrodes 24 and 25 formed on a specific surface 23 of the laminated body 22.

The laminated body 22, includes a plurality of laminated insulator layers and a plurality of the internal electrodes extending along the surfaces of the insulator layers. End portions of the internal electrodes are exposed on the specific surface 23 of the laminated body 22 on which the external electrodes 24 and 25 are not yet formed. The external electrodes 24 and 25 are formed to electrically connect the plurality of end portions of the internal electrodes to each other. When the laminated electronic component 21 is a laminated ceramic capacitor, it provides electrostatic capacity between the external electrodes 24 and 25.

The external electrodes 24 and 25 are substantially composed of only plating deposits, which is similar to the laminated electronic component 1 shown in FIG. 1. In particular, at least portions of the external electrodes 24 and 25, which are directly connected to the internal electrodes, are formed with plating deposits by electroless plating.

In order to manufacture the laminated electronic component 21 shown in FIG. 8, if the external electrodes 24 and 25 are composed of paste electrode layers, the process becomes very cumbersome. This is because an area of the surface of the laminated body 22 except areas on which the external electrodes 24 and 25 are to be formed must be masked and cumbersome processes such as a screen-printing are required. On the other hand, as described in the present preferred embodiment, when the plating deposits are formed directly on the end surfaces of the plurality of internal electrodes, which are exposed at the specific surface 23 of the laminated body 22, masking is not required. Therefore, this process is very simple. In short, the laminated electronic component 21 can be effectively manufactured using the plating method mentioned above.

Figure 9:
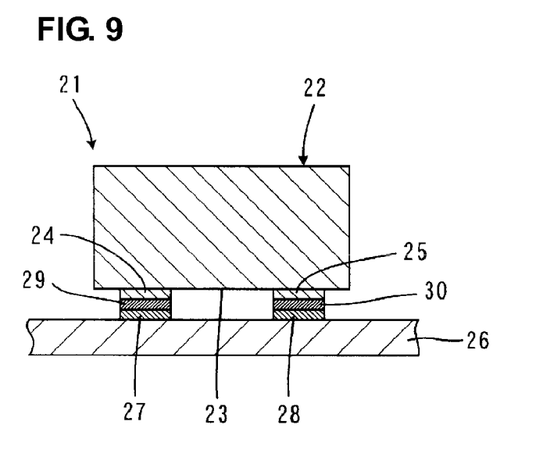
FIG. 9 is a cross-sectional view showing the laminated electronic component, which is shown in FIG. 8, mounted on a substrate.

FIG. 9 shows the laminated electronic component 21 shown in FIG. 8 mounted on a substrate 26.

Terminals 27 and 28 are provided on the surface of the substrate 26. The external electrodes 24 and 25 provided on the laminated electronic component 21 are bonded to the terminals 27 and 28, respectively, using solder 29 and 30. In this mounting arrangement, the solder 29 and 30 is arranged only between the external electrode 24 and the terminal 27 and between the external electrode 25 and the terminal 28.

Figure 10:
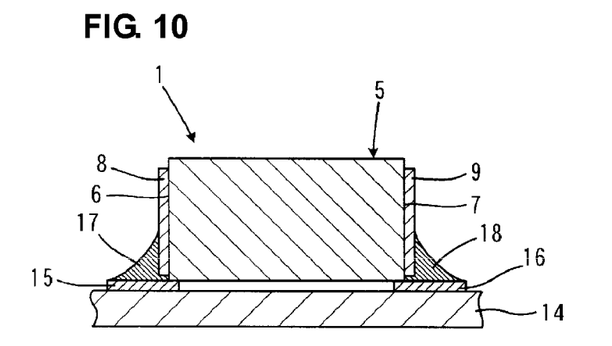
FIG. 10 is a cross-sectional view showing the laminated electronic component, which is shown in FIG. 1, mounted on a substrate.

FIG. 10 shows the laminated electronic component 1 shown in FIG. 1 mounted on a substrate 14.

The laminated electronic component 1 shown in FIG. 1 includes external electrodes 8 and 9 on substantially parallel surfaces thereof opposite each other, and the external electrodes 8 and 9 are not on the same plane. Therefore, when the laminated electronic component 1 is mounted on the substrate 14, the surfaces of the laminated electronic component 1 on which the external electrodes 8 and 9 are provided are substantially perpendicular to the surface of the substrate 14 on which terminals 15 and 16 are provided. In such an arrangement, solder 17 and 18 for bonding the external electrodes 8 and 9 to the respective terminals 15 and 16 has a fillet shape with a sufficient thickness as shown in FIG. 10.

Therefore, according to the mounting condition described with reference to FIG. 9, a density of the components mounted on a substrate 26 can be greater than the density of that of the condition shown in FIG. 10 because the external electrodes 24 and 25 are on the same plane and the solder 29 and 30 does not have the fillet shape.

Furthermore, when the laminated electronic component 21 is a ceramic capacitor, if the amount of the solders 29 and 30 is relatively small in the mounting condition shown in FIG. 9, an equivalent serial inductance (ESL) can be reduced. This results in a smaller phase-shift of a capacitor when charged or discharged. In particular, such a capacitor is practically used in high-frequency applications. Therefore, a structure applied to the laminated electronic component 21 can preferably be used for low-ESL laminated capacitors.

While the present invention has been described with reference to the preferred embodiments shown in FIGS. 1 to 10, it is to be understood that various changes and modifications can be made within a scope of the present invention.

A laminated chip capacitor is provided as a representative example for the laminated electronic component to which the present invention is applied. The present invention can be applied to other laminated electronic components, such as a laminated chip inductor and a laminated chip thermistor.

Therefore, any materials can be used for an insulator layer defining the laminated electronic component as long as the insulator layer has a function of electrical isolation. That is, the materials of the insulator layer are not limited to a dielectric ceramic and may be composed of materials such as a piezoelectric ceramic, a semiconductor ceramic, a magnetic ceramic, and a resin.

Hereinafter, several Experimental Examples are described. The experiments were performed to assist in determining the scope of preferred embodiments of the present invention and to verify the effects of preferred embodiments the present invention.

In the following Table 1, four electroless plating conditions "A" to "D" used in these Experimental Examples are shown.

TABLE 1

| | |
|---|---|
| A | Nickel (II) sulfate 6-hydrate: 0.1 mol/l |
| | Sodium hypophosphite 1-hydrate: 0.2 mol/l |
| | gluconolactone: 0.3 mol/l |
| | bismuth sulfate: $1 \times 10^{-5}$ mol/l |
| | pH: 7.0 |
| | Temperature: 65° C. |
| | 0.6 mmϕ iron media: 100 ml |
| | Rotation condition: 10 r.p.m., 100 min. |
| B | Nickel (II) sulfate 6-hydrate: 0.1 mol/l |
| | Sodium hypophosphite 1-hydrate: 0.2 mol/l |
| | gluconolactone: 0.3 mol/l |
| | bismuth sulfate: $1 \times 10^{-5}$ mol/l |
| | pH: 7.0 |
| | Temperature: 65° C. |
| | 0.6 mmϕ nickel media: 100 ml |
| | Rotation condition: 10 r.p.m., 100 min. |
| C | Copper sulfate 5-hydrate: 10 g/l |
| | Formaldehyde: 4 g/l |
| | potassium sodium tartrate 4-hydrate: 30 g/l |
| | polyethylene glycol: 1 g/l |
| | Sodium hydrate: 5 g/l |
| | Temperature: 40° C. |
| | Aeration: 0.5 l/min. |
| | 0.6 mmϕ iron media: 100 ml |
| | Rotation condition: 10 r.p.m., 100 min. |
| D | Copper sulfate 5-hydrate: 10 g/l |
| | Formaldehyde: 5 g/l |
| | potassium sodium tartrate 4-hydrate: 30 g/l |
| | polyethylene glycol: 1 g/l |
| | Sodium hydrate: 5 g/l |
| | Temperature: 40° C. |
| | Aeration: 0.5 l/min. |
| | 0.6 mmϕ copper media: 100 ml |
| | Rotation condition: 10 r.p.m., 100 min. |

EXPERIMENTAL EXAMPLE 1

In EXPERIMENTAL EXAMPLE 1, several modified laminated bodies that are modifications of a laminated body for a laminated electronic component shown in FIG. 1 were prepared. Each modified laminated body included different distances "s" between internal electrodes (i.e., the thickness of the insulator layer) and withdrawn-depths "d" or a protrusion lengths "p," which are shown in FIGS. 2 and 6. A Ni plating layer was formed directly on each of end surfaces and a Sn plating layer was formed on the Ni plating layer. Through these processes, the performance of the plating process was investigated.

More specifically, samples of the laminated bodies defining laminated ceramic capacitors were prepared for plating. The samples have a length of about 1.6 mm, a width of about 0.8 mm, and a thickness of about 0.8 mm and have an insulator layer made of a barium titanate dielectric material. The thicknesses of the insulator layer and each of the internal electrodes, and a main component of the internal electrodes of the laminated bodies are listed on Table 2 as "Thickness of Insulator Layer," "Thickness of Internal Electrode," "Metal Type of Internal Electrode." At this stage, the maximum value of a withdrawn-depth "d" from an end surface of the laminated body having internal electrodes exposed at the end surface to end portions of the internal electrodes was about 10 μm at the deepest point.

Next, the above-mentioned laminated bodies were sandblasted with an abrasive powder of alumina so that the withdrawn-depth "d" or the protrusion length "p", which is the length from the end surface of the laminated body having the internal electrodes exposed at the end surface to the end portions of the internal electrodes, was adjusted to have values listed on Table 2. For the withdrawn-depth "d", two types of samples were prepared. The samples have a withdrawn-depth of about 2 μm or a withdrawn-depth of about 1 μm, which was measured at the deepest point. For the protrusion length "p", samples having a protrusion depth of about 1 μm, which were measured at the shortest point, were prepared. Note that, for the samples having withdrawn-depth "d", the samples were sandblasted with a force of about 0.25 MPa and the withdrawn-depth "d" of the samples were adjusted by changing the duration of the sandblasting. For the samples having protrusion length "p", the samples were sandblasted with a force of about 0.50 MPa and the protrusion length "p" of the samples was adjusted by changing the duration of the sandblasting.

After the sandblasting, the abrasive powder was removed by washing from the laminated body and the laminated body was dried.

Next, 5,000 pieces of the above-mentioned laminated bodies were immersed into a rotation barrel with a volume of about 300 cc. As shown in "Plating Condition" of Table 2, under a condition "A" described in Table 1, electroless Ni plating films having a thickness of about 5 μm were formed as first plating layers on the surfaces of the end surfaces of the laminated bodies having internal electrodes exposed at the end surfaces.

Next, the above-mentioned rotation barrel including the laminated bodies having the electroless Ni plating films formed as the first plating layer thereon was immersed into a Sn plating bath (Sn-235, DIPSOL CHEMICALS CO., LTD.) filled with a solution for Sn plating controlled to have a pH of about 5.0 and a temperature of about 33° C. Then, the electrifying process was performed for about 50 minutes using electric current with a density of about 0.07 A/dm$^2$ provided through feeding terminals while the plating bath was rotated with a rotation frequency of about 12 rpm. In this manner, Sn plating films having a thickness of about 3 μm were formed as second plating layers on the first plating layers.

Accordingly, the samples of the laminated ceramic capacitors having external electrodes that were formed directly on the laminated bodies by plating without a formation of a paste electrode layer were obtained.

Next, the external electrodes of the obtained 100 pieces of the laminated ceramic capacitors were observed under a microscope and the portions of surface that were not covered with plating deposits (uncovered rate) were determined. Furthermore, for the samples having an uncovered rate of 0%, the time required for achieving the uncovered rate of 0% was measured. The average values of these results are shown in Table 2.

TABLE 2

| Sample Number | Thickness of Insulator Layer (μm) | Thickness of Internal Electrode (μm) | Metal Type of Internal Electrode | d or p (μm) | Plating Condition | Uncovered Rate (%) | Required Time (min.) |
|---|---|---|---|---|---|---|---|
| 1 | 20 | 1 | Pd | d = 2 | A | 60 | — |
| 2 | 20 | 1 | Ni | d = 2 | A | 90 | — |
| 3 | 20 | 1 | Pd | d = 1 | A | 0 | 110 |
| 4 | 20 | 1 | Ni | d = 1 | A | 0 | 120 |
| 5 | 50 | 1 | Ni | d = 1 | A | 30 | — |
| 6 | 20 | 1 | Ni | p = 1 | A | 0 | 90 |
| 7 | 50 | 1 | Ni | p = 1 | A | 0 | 90 |

As shown in Table 2, Samples 1 and 2 have high uncovered rates because the withdrawn-depth "d" from the end surface of the laminated body having the internal electrodes exposed thereon to the end portions of the internal electrodes was relatively large. In contrast, Samples 3 and 4 have an uncovered rate of 0% because the withdrawn-depth "d" was small, i.e., about 1 μm. However, as the result of Sample 5 indicates, although the withdrawn-depth "d" is about 1 μm, when the "Thickness of Insulator Layer", i.e., the distance between the adjacent internal electrodes is greater than about 20 μm, portions that are not covered with plating occur.

For Samples 6 and 7, plating efficiency was greater than that of Samples 3 and 4 and the time required for forming a plating layer could be reduced. This is because the end portions of the internal electrodes protrude from exposed surfaces of the laminated bodies. Furthermore, as the result of Sample 7 indicates, although the "Thickness of Insulator Layer", i.e., the distance between the adjacent internal electrodes was large, i.e., about 50 μm, the uncovered rate of 0% was achieved.

Results obtained from Samples 4 to 7 show that a first plating layer having high compactness can be obtained by sandblasting performed in advance even if a main component of the internal electrodes is a base metal such as Ni having a low catalytic activity.

EXPERIMENTAL EXAMPLE 2

In Experimental Example 2, an influence of the thickness of the internal electrodes of the laminated bodies under certain conditions of samples and plating was investigated.

All samples of laminated bodies include insulator layers having a thickness of about 20 μm and the internal electrodes made of Ni as a main component. The thickness of the internal electrodes of the samples was varied as shown in "Thickness of Internal Electrode" of Table 3 and other conditions of the samples of the laminated bodies were the same as those used in as Experimental Example 1.

Next, laminated bodies of Samples 11 to 13 alone were sandblasted with the same abrasive as used in Experimental Experiment 1 and a withdrawn-depth "d" from an end surface of the laminated body having the internal electrodes exposed thereon to end portions of the internal electrodes was adjusted to be about 0.1 μm.

Next, 5,000 pieces of the above-mentioned laminated bodies were immersed in a rotation barrel with a volume of about 300 cc. As shown in "Plating Condition" of Table 3, under the condition "A" described in Table 1, electroless Ni plating films having a thickness of about 5 μm were formed as first plating layers on the surfaces of the end surfaces of the laminated bodies having the internal electrodes exposed at the end surfaces.

Next, using the same method as used in Experimental Experiment 1, Sn plating films having a thickness of about 3 μm were formed as second plating layers on the first plating layers.

Accordingly, the samples of laminated ceramic capacitors having external electrodes that were formed directly on the laminated bodies by plating without formation of paste electrode layers were obtained.

Next, for the obtained 100 pieces of the laminated ceramic capacitors, uncovered rates of plating of the samples were determined in the same manner as used in Experimental Example 1. Furthermore, for the samples having an uncoverage rate of 0%, a time required for achieving the uncoverage rate of 0% was measured. The average values of these results are shown in Table 3.

TABLE 3

| Sample Number | Thickness of Insulator Layer (μm) | Thickness of Internal Electrode (μm) | Metal Type of Internal Electrode | d (μm) | Plating Condition | Uncoverage Rate (%) | Required Time (min.) |
|---|---|---|---|---|---|---|---|
| 11 | 20 | 0.8 | Ni | 0.1 | A | 0 | 90 |
| 12 | 20 | 0.4 | Ni | 0.1 | A | 0 | 90 |
| 13 | 20 | 0.2 | Ni | 0.1 | A | 0 | 90 |
| 14 | 20 | 0.8 | Ni | 2 | A | 93 | — |
| 15 | 50 | 0.4 | Ni | 2 | A | 97 | — |

As shown in Table 3, Samples 11 to 13 had an uncoverage rate of plating of 0% though the thickness of the internal electrodes of the samples was less than 1.0 μm. This is because the withdrawn-depth "d" from the end surface of the laminated body having internal electrodes exposed thereon to the end portions of the internal electrodes becomes 1 μm or less by sandblasting performed in advance.

On the contrary, for Samples 14 and 15, uncoverage with plating occurred when the thickness of the internal electrodes of the sample was less than 1.0 μm. This is because the withdrawn-depth "d" of the internal electrodes was large, i.e., 2 μm.

Generally, the use of thick internal electrodes has been an important requirement to directly form the first plating layer composed of an electroless plating film without a performance of a process for giving a catalyst in advance. Based on the above results, however, it was found that the first plating layer having a high compactness could be formed by reducing the withdrawn-depth "d" of the internal electrodes when the thickness of the internal electrodes was less than 1.0 μm.

EXPERIMENTAL EXAMPLE 3

In Experimental Example 3, a first plating layer was formed using various plating metal ions under various plating conditions.

All samples of laminated bodies include insulator layers having a thickness of 20 μm and internal electrodes having a thickness of 0.6 μm. A main component of the internal electrodes of the samples was varied as shown in "Metal Type of Internal Electrode" of Table 4 and other conditions of the samples of the laminated bodies were the same as used in Experimental Example 1.

Next, the laminated bodies were sandblasted with the same abrasive as used in Experimental Experiment 1 and withdrawn-depth "d" from an end surface of the laminated bodies having the internal electrodes exposed thereon to end portions of the internal electrodes was adjusted to be 0.1 μm.

Next, 5,000 pieces of the above-mentioned laminated bodies were immersed into a rotation barrel with a volume of 300 cc. As shown in "Plating Condition" of Table 4, under the condition "B", "C", or "D" described in Table 1, electroless plating films having a thickness of 10 μm were formed as first plating layers on the surfaces of the end surfaces of the laminated bodies having the internal electrodes exposed at the end surfaces. An electroless Ni plating film was formed for Sample 21 and an electroless Cu plating film was formed for Samples 22 to 24.

Next, using the same method as used in Experimental Experiment 1, Sn plating films having a thickness of 5 μm were formed as second plating layers on the first plating layers of Sample 21.

For Samples 22 to 24, the above-mentioned rotation barrel containing the laminated bodies having the first plating layer thereon was immersed into a Watts bath for Ni plating filled with a solution controlled to have a pH of 4.2 and a temperature of 60° C. Then, an electrifying process was started using electric current with a density of 0.2 A/dm$^2$ provided through feeding terminals while the plating bath was rotated with a rotation frequency of 10 r.p.m. After 60 minutes from the beginning of the power distribution, a Ni plating film having a thickness of 5 μm was formed as a second plating layer. Continuously, the rotation barrel containing the laminated bodies having the second plating layer thereon was immersed into a Sn plating bath (Sn-235, DIPSOL CHEMICALS CO., LTD.) filled with another solution controlled to have a pH of 5.0 and a temperature of 33° C. Then, an electrifying process was performed for 50 minutes using electric current with a density of 0.07 A/dm$^2$ provided through the feeding terminals while the plating bath was rotated with a rotation frequency of 12 r.p.m. In such a manner, a Sn plating film having a thickness of 5 μm was formed as a third plating layer on the first plating layer.

According to this manner, the samples of the laminated ceramic capacitors having the external electrodes that were formed directly on the laminated bodies by plating without formation of a paste electrode layer were obtained.

Next, for the obtained 100 pieces of the laminated ceramic capacitors, uncoverage rates of plating of the samples were determined in the same manner as used in Experimental Example 1. Furthermore, for the samples having an uncoverage rate of 0%, a time required for achieving the uncoverage rate of 0% was measured. The average values of these results are shown in Table 4.

TABLE 4

| Sample Number | Thickness of Insulator Layer (μm) | Thickness of Internal Electrode (μm) | Metal Type of Internal Electrode | d (μm) | Plating Condition | Uncovered Rate (%) | Required Time (min.) |
|---|---|---|---|---|---|---|---|
| 21 | 20 | 0.6 | Cu | 0.1 | B | 0 | 90 |
| 22 | 20 | 0.6 | Cu | 0.1 | C | 0 | 90 |
| 23 | 20 | 0.6 | Ag | 0.1 | C | 0 | 90 |
| 24 | 20 | 0.6 | Ni | 0.1 | D | 0 | 90 |

As shown in Table 4, all of Samples 21 to 24 had an uncovered rate of plating of 0%. According to this, it was discovered that even if the main component of the internal electrodes or the main component metal of the first plating layer was changed, the electroless plating film having a high compactness can be formed which results in the laminated ceramic capacitor having high reliability.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A method for manufacturing a laminated electronic component comprising the steps of:
   preparing a laminated body including a plurality of laminated insulator layers and a plurality of internal electrodes extending along surfaces of the insulator layers, wherein end portions of the internal electrodes are exposed at a predetermined surface of the laminated body; and
   forming an external electrode on the predetermined surface of the laminated body to electrically connect the end portions of the plurality of the internal electrodes being exposed at the predetermined surface of the laminated body to each other;

wherein in the laminated body prepared in the step of preparing the laminated body, at the predetermined surface at which the internal electrodes are exposed, the internal electrodes are electrically isolated from adjacent internal electrodes, and a distance between the internal electrodes disposed adjacently is about 20 μm or less when measured along the thickness direction of the insulator layer, and a withdrawn-depth of the internal electrodes is about 1 μm or less when measured from the predetermined surface;

the step of forming the external electrode includes a step of electroless plating, wherein the electroless plating with plating solution including a reducer is performed directly on the end portions of the plurality of the internal electrodes being exposed at the predetermined surface of the laminated body prepared in the step of preparing the laminated body; and the step of electroless plating includes a step of growing plating deposits formed at the end portions of the plurality of the internal electrodes to connect each other.

2. The method for manufacturing the laminated electronic component according to claim 1, further comprising a step of abrading the laminated body using an abrasive before the step of forming the external electrode.

3. The method for manufacturing the laminated electronic component according to claim 1, wherein a main component of the internal electrodes is at least one element selected from Ni, Cu, and Ag.

4. A method for manufacturing a laminated electronic component comprising the steps of:

preparing a laminated body including a plurality of laminated insulator layers and a plurality of internal electrodes extending along surfaces of the insulator layers, wherein end portions of the internal electrodes are exposed at a predetermined surface of the laminated body; and forming an external electrode on the predetermined surface of the laminated body to electrically connect the end portions of the plurality of the internal electrodes being exposed at the predetermined surface of the laminated body to each other;

wherein in the laminated body prepared in the step of preparing the laminated body, at the predetermined surface at which the internal electrodes are exposed, the internal electrodes are electrically isolated from adjacent internal electrodes, and a distance between the internal electrodes disposed adjacently is about 50 μm or less when measured along the thickness direction of the insulator layer, and a protrusion length of the internal electrodes is at least about 0.1 μm when measured from the predetermined surface;

the step of forming the external electrode includes a step of electroless plating, wherein the electroless plating with plating solution including a reducer is performed directly on the end portions of the plurality of the internal electrodes being exposed at the predetermined surface of the laminated body prepared in the step of preparing the laminated body; and the step of electroless plating includes a step of growing plating deposits formed at the end portions of the plurality of the internal electrodes to connect each other.

5. The method for manufacturing the laminated electronic component according to claim 4, further comprising a step of abrading the laminated body using an abrasive before the step of forming the external electrode.

6. The method for manufacturing the laminated electronic component according to claim 4, wherein a main component of the internal electrodes is at least one element selected from Ni, Cu, and Ag.

7. A laminated electronic component comprising:

a laminated body including a plurality of laminated insulator layers and a plurality of internal electrodes extending along surfaces of the insulator layers, wherein end portions of the internal electrodes are exposed at a predetermined surface of the laminated body; and an external electrode provided on the predetermined surface of the laminated body to electrically connect the end portions of the plurality of internal electrodes being exposed at the predetermined surface of the laminated body to each other; wherein in the laminated body, at the predetermined surface at which the internal electrodes are exposed, a distance between the internal electrodes disposed adjacently is about 20 μm or less when measured along the thickness direction of the insulator layer, and a withdrawn-depth of the internal electrodes is about 1 μm or less when measured from the predetermined surface; and at least a portion of the external electrode connected directly to the internal electrodes is defined by plating deposits formed by electroless plating.

8. The laminated electronic component according to claim 7, wherein a main component of the internal electrodes is at least one element selected from Ni, Cu, and Ag.

9. A laminated electronic component comprising:

a laminated body including a plurality of laminated insulator layers and a plurality of internal electrodes extending along surfaces of the insulator layers, wherein end portions of the internal electrodes are exposed at a predetermined surface of the laminated body; and an external electrode provided on the predetermined surface of the laminated body to electrically connect the end portions of the plurality of internal electrodes being exposed at the predetermined surface of the laminated body to each other; wherein in the laminated body, at the predetermined surface at which the internal electrodes are exposed, a distance between the internal electrodes disposed adjacently is about 50 μtm or less when measured along the thickness direction of the insulator layer, and a protrusion length of the internal electrodes is at least about 0.1 μm when measured from the predetermined surface; and at least a portion of the external electrode connected directly to the internal electrodes is defined by plating deposits formed by electroless plating.

10. The laminated electronic component according to claim 9, wherein a main component of the internal electrodes is at least one element selected from Ni, Cu, and Ag.

* * * * *